UNITED STATES PATENT OFFICE.

CONSTANT LAVAL, OF ALLEGHENY, PENNSYLVANIA, ASSIGNOR OF ONE-HALF TO J. W. PETERS AND C. M. SUTER, OF SAME PLACE.

PROCESS OF PREPARING SILVERING LIQUID.

SPECIFICATION forming part of Letters Patent No. 670,156, dated March 19, 1901.

Application filed March 6, 1900. Serial No. 7,548. (Specimens.)

*To all whom it may concern:*

Be it known that I, CONSTANT LAVAL, a citizen of the United States, residing at Allegheny, in the county of Allegheny and State of Pennsylvania, have invented new and useful Improvements in Processes of Preparing a Silvering Liquid, of which the following is a specification.

My invention relates to a process of preparing a liquid for silvering glass, &c.

It is the main object of my invention to provide a silvering liquid adapted for convenient application for silvering bulbs of incandescent electric lights, so that a portion of said bulbs shall act as a reflector.

In practice I have found that the ordinary silvering preparations cannot be successfully employed for this purpose, as they will not withstand the heat and will either peel off or tarnish. It is the aim, therefore, of my invention to provide a silvering liquid which when applied to and deposited upon the glass bulbs of incandescent lights will furnish a brilliant reflecting-surface and one which will not tarnish or peel off under a high degree of heat or be injuriously affected by cold or dampness. Applications of the liquid for silvering articles other than glass bulbs are of course contemplated.

My improved silvering liquid is prepared and used in the following-described manner: I first dissolve fifty grams of nitrate of silver in eight ounces of distilled water and then add one ounce and a half of concentrated ammonia having a strength of twenty-six per cent. This mixture is well shaken and filtered and forms what I will term "solution No. 1." In a suitable receptacle I next dissolve fifty grams of potassium and sodium tartrate in eight ounces of distilled water. This I term "mixture A." In another receptacle twenty grams of powdered nickel sesquioxid are mixed in four ounces of filtered water. This I term "mixture B." Mixtures A and B are then poured into an evaporating-pan, which is placed on any suitable heating apparatus. The mixture is then stirred until it has been brought to the boiling-point or until a thin film has formed on the surface of the liquid, after which it is cooled and filtered. This forms what I will term "solution No. 2."

When the above-described preparations are to be used, I mix one ounce of solution No. 1 and one ounce of solution No. 2 with sixteen ounces of distilled water, thereby forming the silvering liquid, which must be used immediately.

In proceeding to apply the silvering liquid the glass bulb or other glass article is first cleansed by rubbing its surface with a wet bag containing powdered sulfate of iron, after which the glass article is held under running water and rubbed with a brush until it is free of the sulfate of iron and then rinsed off in distilled water. The silvering liquid may now be poured on the bulb, and it will be found that the metal will instantaneously deposit on the glass. A porcelain dish may be employed to catch the liquid, and the same liquid may be poured over the bulb several times until the latter has acquired a uniform coating. When dry, the portion of the deposit that I desire to remain on the bulb is coated with a mixture of aluminium powder and crystalline varnish or liquid celluloid. When this coating has dried, the remainder of the deposit may be removed from the bulb by means of pumice-stone.

The nickel sesquioxid, in conjunction with the potassium and sodium tartrate, acts as a reactionary agent to deposit the silver on the glass and causes a strong adherence of the same thereto.

In proceeding to apply the silvering liquid or mixture to a glass bulb, globe, or other glass article the said article must be first cleaned and rinsed off before mixing the solutions 1 and 2, and as soon as the said solutions 1 and 2 are mixed the liquid must be poured over the bulb or other glass article, as it takes less than a minute for solution No. 2 to react on solution No. 1 and cause the metals to deposit. The mixture of silver and nickel makes a more adherent and hard coating than can be obtained with silver alone.

What I claim as my invention is—

1. The process of preparing a silvering liquid, which consists in mixing nitrate of silver, water and ammonia and filtering the same; also mixing potassium and sodium tartrate with water; also mixing nickel sesquioxid with water; then uniting the said potassium and sodium tartrate and nickel sesquioxid mixtures and filtering; and finally mixing equal parts of the filtered solutions immediately before using.

2. The process of preparing a silvering liquid, which consists in mixing nitrate of silver, water and ammonia and filtering the same; forming separate mixtures of potassium and sodium tartrate and nickel sesquioxid and boiling and filtering the same; and finally mixing equal parts of the filtered solutions with water, immediately before applying said liquid to the article to be silvered.

In testimony whereof I have hereunto set my hand in presence of two subscribing witnesses.

CONSTANT LAVAL.

Witnesses:
J. W. PETERS,
C. M. SUTER.